Nov. 12, 1963  L. B. SHUSTER  3,110,207
CLOTH CUTTING APPARATUS HAVING ANVIL ROLLERS OPERATING
ACROSS A DIE AT RIGHT ANGLES TO EACH OTHER
Filed June 15, 1960  8 Sheets-Sheet 1

INVENTOR
Leo B. Shuster

INVENTOR
Leo B. Shuster

Nov. 12, 1963    L. B. SHUSTER    3,110,207
CLOTH CUTTING APPARATUS HAVING ANVIL ROLLERS OPERATING
ACROSS A DIE AT RIGHT ANGLES TO EACH OTHER
Filed June 15, 1960    8 Sheets-Sheet 4

INVENTOR

Leo B. Shuster

Nov. 12, 1963 L. B. SHUSTER 3,110,207
CLOTH CUTTING APPARATUS HAVING ANVIL ROLLERS OPERATING
ACROSS A DIE AT RIGHT ANGLES TO EACH OTHER
Filed June 15, 1960 8 Sheets-Sheet 5

INVENTOR
Leo B. Shuster

Nov. 12, 1963 L. B. SHUSTER 3,110,207
CLOTH CUTTING APPARATUS HAVING ANVIL ROLLERS OPERATING
ACROSS A DIE AT RIGHT ANGLES TO EACH OTHER
Filed June 15, 1960 8 Sheets-Sheet 6

INVENTOR
Leo B. Shuster

Nov. 12, 1963  L. B. SHUSTER  3,110,207
CLOTH CUTTING APPARATUS HAVING ANVIL ROLLERS OPERATING
ACROSS A DIE AT RIGHT ANGLES TO EACH OTHER
Filed June 15, 1960  8 Sheets-Sheet 7
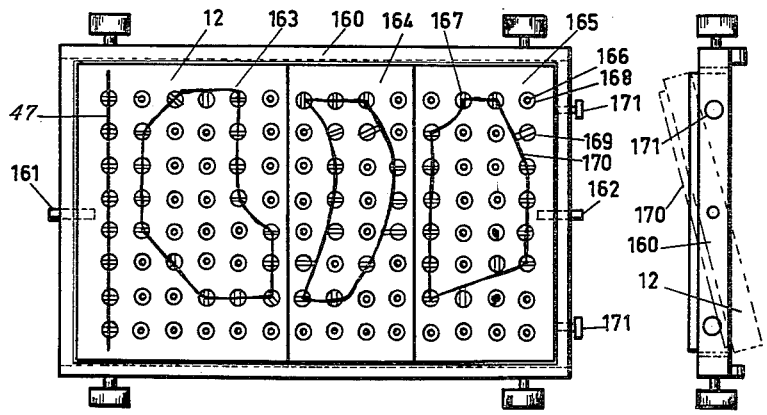
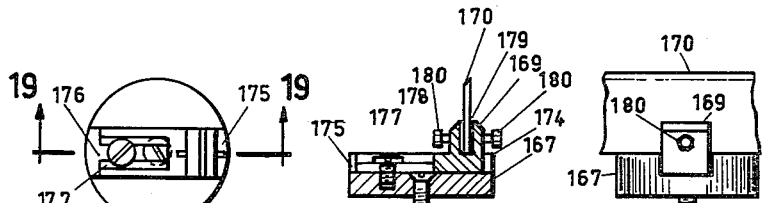
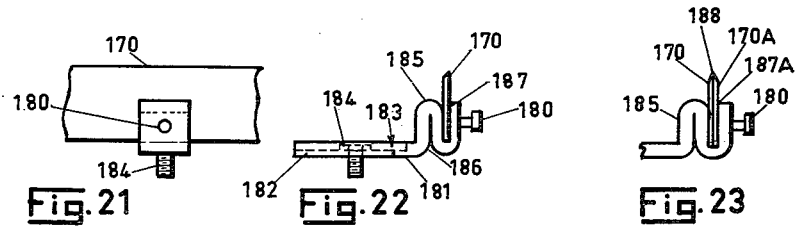
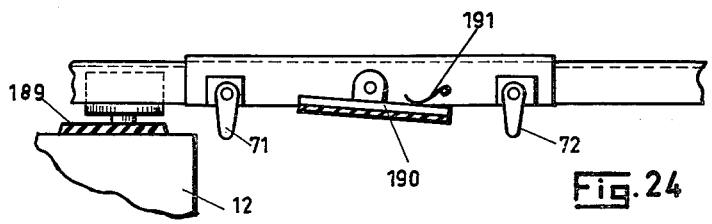
INVENTOR
Leo B. Shuster INVENTOR
Lee B. Shuster United States Patent Office 3,110,207
Patented Nov. 12, 1963

3,110,207
CLOTH CUTTING APPARATUS HAVING ANVIL ROLLERS OPERATING ACROSS A DIE AT RIGHT ANGLES TO EACH OTHER
Leo B. Shuster, 129 Dufferin Road, Montreal 29, Quebec, Canada
Filed June 15, 1960, Ser. No. 36,278
19 Claims. (Cl. 83—87)

This invention relates to improvements in cloth-cutting mechanisms and processes, and more particularly to improvements in cloth-cutting mechanisms and processes adapted to mass produce a series of identical garment parts and the like, automatically and rapidly.

A variety of mechanisms and processes have previously been utilized to mass produce identical cloth parts and the like. Such mechanisms have proved to be inadequate for the present day demand of mass produced parts required to supply a maximum quantity of sewing and other machines in clothing factories, necessitating an unnecessarily large quantity of cloth cutting machines to supply a quantity of finishing machines, having the disadvantage that extensive space requirements, lowered output per man-hour and increased overhead cost per unit cut is encountered.

Further disadvantages in regard to conventional cutting mechanisms and processes lie in the excessive waste encountered and the inaccuracy in cutting, such in accuracy being particularly encountered in spreading of cloth in a plurality of layers for knife or die cutting. Each successive layer of cloth having a tendency to draw in the layer beneath as it is being spread, each successively lower layer therefore being a little larger than the directly preceeding layer of cloth, this tending to gradually enlargen the general area of the pattern, limiting the amount of layers that may be cut to a comparatively small quantity in order to maintain the difference in size between the first and the last layer within a reasonable tolerance. Even so it is often necessary to re-cut smaller parts such as collars, cuffs, etc. on account of too great distortion in these panels in comparison with the required size, necessitating make-shift remedy during production to offset such inaccuracy of cutting. Other disadvantages with this procedure lie in rise of overhead cost per unit of production on account of reduced output, and requirement of highly skilled technicians for the purpose of adjusting and correcting such inaccuracies as they arise.

It is an object of this invention to provide a cloth cutting mechanism and process in the following called "A Cloth Cutter" adapted to greatly increase the output per man-hour compared with that of conventional cutters and at the same time reduce overhead costs per unit cut.

It is another object of this invention to provide a cloth cutter adapted to cut a comparatively large area of cloth into a plurality of design parts at each pass of the mechanism during a working cycle, and each design pattern being extremely accurate in shape and identical to a similar part cut by any other pass of the mechanism, and thereby reduce waste to an absolute minimum.

It is a further object of this invention to provide a cloth cutter adapted to supply all cutting edges with adequate shearing pressure during a pass of the mechanism, to ensure penetration of the cutting edge of the cutting blades entirely through the cloth required to be cut.

It is still another object of this invention to provide a cloth cutter adapted to utilize a plurality of extremely simple cutting blade holders with scant height requirements, the cutting blade holders being adapted to be mass produced at extremely low cost.

It is another object of this invention to provide a cloth cutter adapted to utilize a cloth cutting blade, that permits two blades to be located directly adjacent each other at for instance a cross-over point in the pattern combination, both cutting edges of such two cutting blades being adapted to cut in the same line, making only one cut at that location.

Another object of this invention is to provide a cloth cutter supplied with an automatic retractable feed system, adapted to permit rapid change of cloth from one bolt of cloth to another without missing one stroke of the cutting cycle.

It is still another object of this invention to provide a cloth cutter incorporating a transport drum adapted to have pressure and vacuum means in combination with valve means, marked for controllable manual adjustment to hold, transport and deposit various grades of material such as silk, broadcloth, wool etc. onto a suitable receivingt able.

It is still a further object of this invention to provide a cloth cutter that is adapted to be produced in considerable length, to provide for cutting a quantity of duplicate forms within the same pass, without proportional rise in overall cost of the mechanism.

It is a further object of this invention to provide a cloth cutter adapted to be utilized as a double acting mechanism, the same set of cutting blades being adapted to cut on both forward and backward strokes of the pass.

It is another object of this invention to provide a cloth cutter adapted to utilize two cutting rollers adapted to traverse the surface of the cutting blades in a direction substantially at 90° to each other, thereby ensuring that every point of the edge of every cutting blade is traversed by a roller having its axis substantially non-parallel to the edge of the pertinent cutting blade.

These and other objects and features of this invention will become apparent when taken into conjunction with the accompanying drawings in which:

FIG. 16 is a reverse plan view of the die table showing particularly method of locating cutting blades thereon.

FIG. 17 is an end view of the die table shown in FIGURE 16 illustrating particularly the swivelling feature of the die platen within the die table.

FIG. 18 is a plan view of one configuration of a cutting blade holder embodied in this invention.

FIG. 19 is a sectional view of the cutting blade holder shown in FIGURE 18, taken on the line 19—19.

FIG. 20 is a fragmentary side view of the cutting blade holder shown in FIGURE 19.

FIG. 21 is a fragmentary side view of a simplified cutting blade holder embodied in this invention.

FIG. 22 is a side view of the cutting blade holder shown in FIGURE 21, illustrating method of locating one cutting blade therein.

FIG. 23 is a fragmentary side view of a cutting blade holder of a type similar to that shown in FIG. 22, the cutting blade holder shown in FIG. 23 being adapted to hold two adjacently located cutting blades in blade crossover positions, representing altogether only one cutting edge to the cloth.

FIG. 24 is a fragmentary plan view of one method of incorporating a switching and braking system, utilized to stop and reverse direction of action of the die table and the receiving table embodied in this invention.

Figure 1:
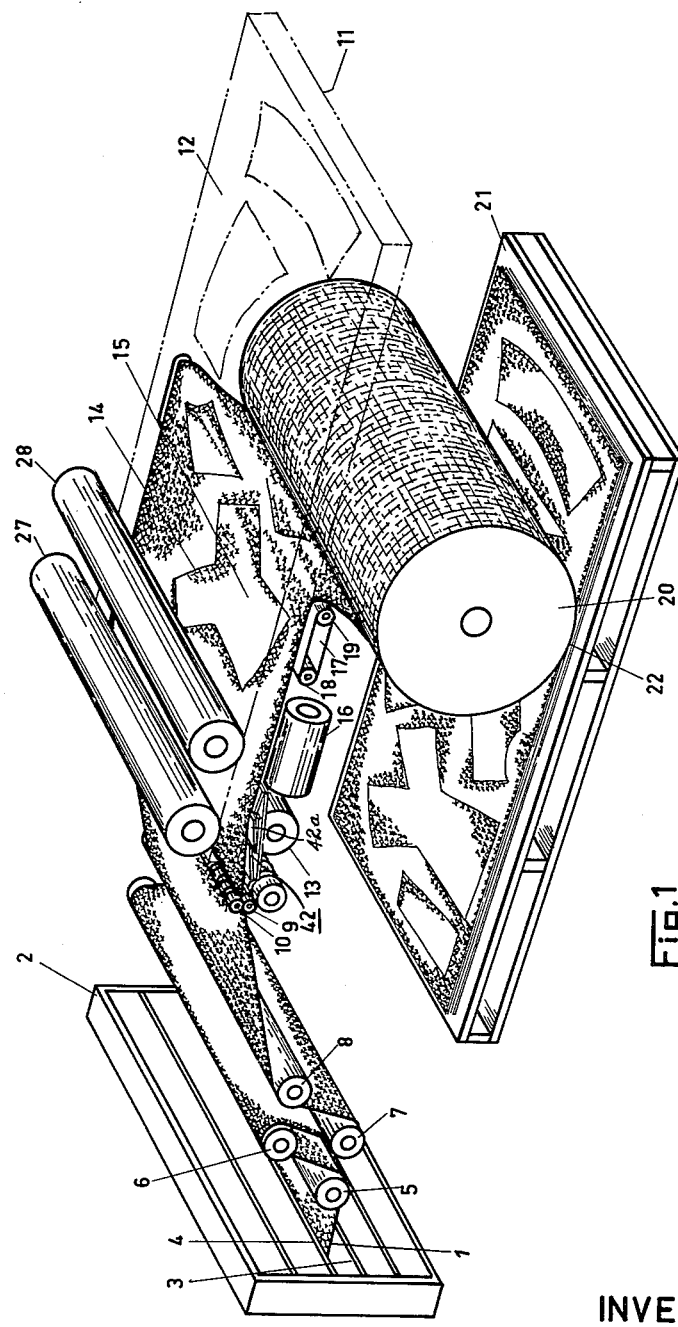
FIG. 1 is a diagrammatic perspective view of the general sequence of cloth traversing through a cloth cutter embodying this invention.

Referring first to FIG. 1, a length of cloth 1 is fed in a continuous strip from a roll (not shown in this figure) located behind a rack 2, cloth 1 being fed through rack 2 between shelves 3 and 4, cloth 1 being adapted to traverse a succession of aligning rollers 5, 6, 7 and 8 toward feed rollers 9 and 10 that are coated with resilient material and adapted to controllably feed cloth 1 toward cutting surface 11 located on underside of a die table 12 and a primary cutting roller 13 having its axis of rotation disposed transversely of longitudinal direction of die table 12.

Cloth 1, upon passing between cutting surface 11 of die table 12 and cutting roller 13, is cut by a series of cutting blades 14 located on surface 11, cutting blades 14 being adapted to cut out complete patterns 15 in cloth 1 as cutting blades 14 pass over primary cutting roller 13, primary cutting roller 13 exerting sufficient pressure upon the cloth 1 to force cutting blades 14 through cloth 1, but there is not sufficient pressure to permit the cutting blades 14 to penetrate entirely through the cloth 1.

In patterns 15, portions of cutting edges 14 may be located substantially parallel to the axis of cutting roller 13, providing the possibility that the combined cutting edge, required to be simultaneously cut, is excessive, resulting in only partial cut through of cloth 1.

To ensure that all edges of patterns 15, are cut fully through cloth 1, a secondary roller 16 is provided having its rotational axis disposed perpendicular to the axis of roller 13, roller 16 being adapted to move with a rapid reciprocating motion transversely of the longitudinal direction of cloth 1, roller 16 being of a length substantially greater than the longitudinal travel of cloth 1 during one complete reciprocating cycle of roller 16, roller 16 being adapted, through transverse guide means (not shown in this figure) to apply pressure against blades 14 as roller 16 traverses under surface 11 of die table 12 in direction parallel to and in close proximity of roller 13, thereby causing all cutting edges 14 to be traversed by secondary cutting roller 16 during each pass to ensure that any pattern edges that have not been fully cut through by primary cutting roller 13 are cut through by secondary cutting roller 16, any edges of patterns 15 that may be substantially parallel to primary cutting roller 13, and therefore offer sufficient resistance to prevent complete cut through of said parallel edges, will, upon encountering secondary cutting roller 16, be cut through by the cutting pressure exerted thereby during traversing motion, since no cutting edges of patterns 15 can be substantially parallel to both primary cutting roller 13 and secondary cutting roller 16.

Primary cutting roller 13 and secondary cutting roller 16 have their surfaces coated with a resilient material, adapted to prevent a dulling action on cutting blades 14 yet at the same time provide sufficient pressure to ensure full cut-through of cloth 1.

An endless belt 17 is located on two rollers 18 and 19, belt 17 being driven through driving means and being adapted to support cloth 1 with the cut-out portions thereof, for the distance between traversing secondary roller 16 and a receiving drum 20, adapted through vacuum means to receivably hold and transport cloth 1 over th transition area from belt 17 to a longitudinally movable receiving pallet 21, adapted to receive and stack consecutive portions of cloth 1 as this is deposited thereon by drum 20. Drum 20 is adapted through pneumatic pressure means to automatically discharge cloth 1 onto receiving pallet 21.

Die table 12 is adapted to move longitudinally within guides in a frame structure (not shown in this figure), the longitudinal speed of die table 12 being adapted, during its forward motion away from rack 2, to be identical to the speed imparted to cloth 1 by the feed rollers 9 and 10. Die table 12 is selectively adapted to have either the complete surface 11 thereof, or only a portion of surface 11, traverse primary roller 13 and secondary roller 16, die cutting table 12 being adapted, through reversible means, to be returned to its initial position upon one traversing movement in direction away from rack 2 being completed.

Belt 17 may be adapted to have imparted thereto a surface speed slightly greater than that of the cloth moving thereover, in order to ensure that cloth 1 will be properly transported thereover, without any loose pattern edges or ends being permitted to hang down and create a fold during transition thereof. Die table 12 and receiving pallet 21 are adapted to move longitudinally within said frame synchronously with each other, die table 12 being adapted to have its cycle offset in relation to the cycle of receiving pallet 21, a distance equal to the length stretching from primary cutting roller 13, over belt 17, around drum 20 to point of contact 22 between drum 20 and receiving pallet 21, this offset between the two table cycles being provided either by die table 12 overshooting complete cutting cycle by this pertinent distance to ensure complete laydown of cloth cut at one pass or die table 12 in relation to longitudinal motion of receiving pallet 21, die table 12 being adapted to start its motion cycle and progress a distance equal to length of cloth between roller 13 and contact point 22 before receiving pallet 21 starts longitudianl motion in the same direction as die table 12, receiving pallet 21 continuing its motion away from rack 2 until full pass of cloth has been deposited thereon, while die table 12 finishes its cutting cycle, reverses and returns part way back to its start position.

Forward speed (away from rack 2) of die table 12 and receiving pallet 21 is identical, whereas return of both tables may be performed at greater speed as required, return speed of die table 12 not necessarily being identical to return speed of receiving pallet 21.

Figure 2:
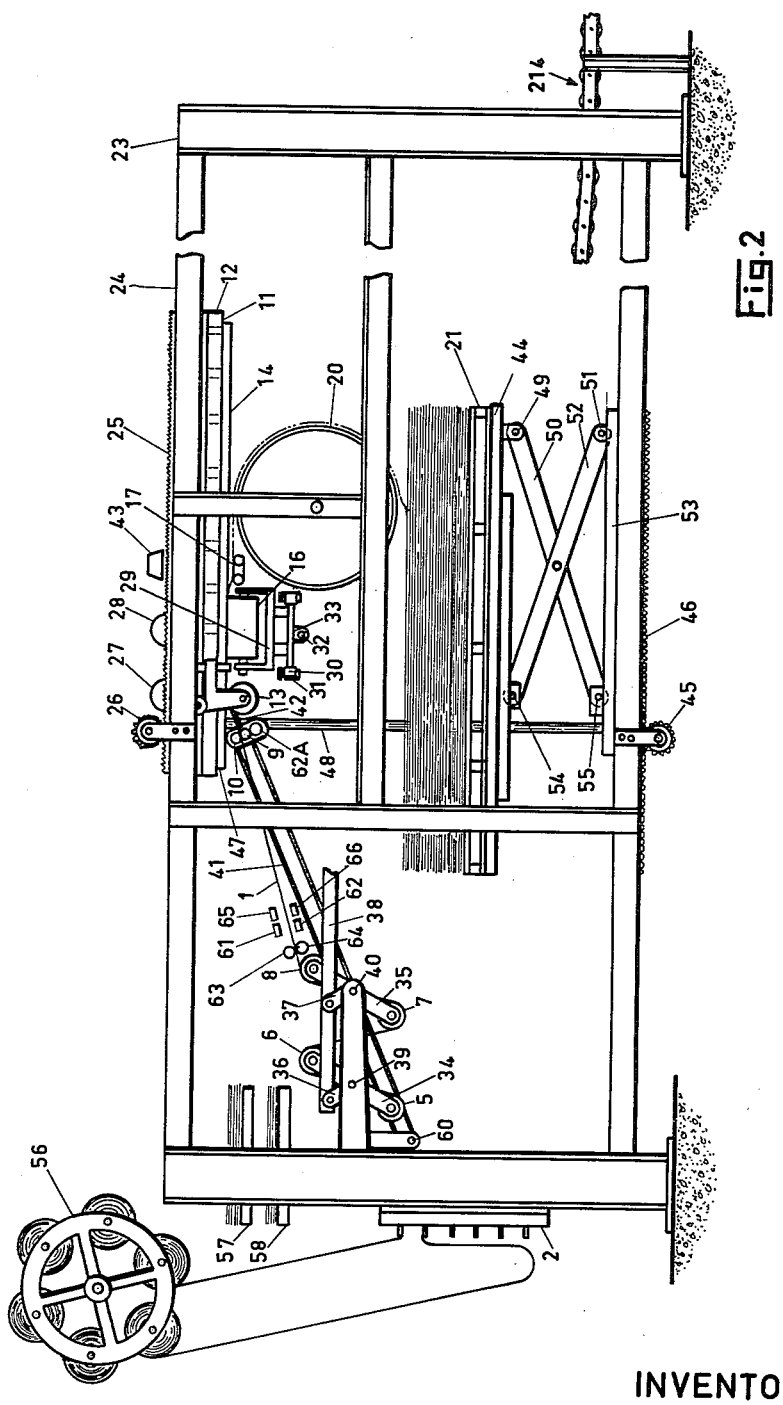
FIG. 2 is a side elevation of a cloth cutter embodying a preferred form of this invention.

Referring to FIG. 2, a side elevation of the cloth cutter illustrated in FIG. 1 is shown, comprising a frame structure 23 of suitable rigidity to sustain the operating parts of this invention, upper beams 24 of frame 23 being adapted to carry and guide die table 12 in horizontal longitudinal direction, die table 12 being motivated in forward or reverse longitudinal direction through conventional motivating means such as for instance rack 25 and pinion 26, said pinion in turn having imparted thereto forward or reverse rotation energy through conventional selective means.

Primary roller 13 is shown directly beneath a counter pressure roller 27 adapted to exert downward pressure on top surface of die table 12 to counteract upward pressure of primary cutting roller 13 during cutting operation.

A second spring loaded roller 28 is adapted, in the same manner, to counteract reaction pressure on die table 12 resulting from cutting pressure being exerted by roller 16 vertically upwards on cutting blades 14 as secondary cutting roller 16 traverses die table 12.

Secondary roller 16 is rotatably located in housing 29 which is carried on rollers 30, adapted to roll in guides 31 located transversely of longitudinal direction of motion of die table 12. Transverse motion may be imparted to housing 29 by a threaded spindle 32, carried at its two ends by frame 23, spindle 32 being supplied with an endless thread, part of the endless thread being a right hand thread, the rest of the endless thread being a left hand thread, spindle 32 being engaged in a nut 33 located on housing 29, nut 33 being adapted to constantly follow the endless thread as it changes from right hand thread to left hand thread at one end of the spindle, and left hand thread to right hand thread at the other end of the spindle.

Aligning rollers 5, 6, 7 and 8 are located on two parallel disposed inter-linked arms 34 and 35 as shown, levers 36 and 37 being rigidly attached to arms 34 and 35 respectively, levers 36 and 37 being interconnected by a link arm 38 adapted to be controllably actuated in horiozntal direction to pivotably rotate levers 34 and 35 about pivot centers 39 and 40 respectively in clock-wise direction, to dispose roller 7 substantially above roller 6, roller 7 being a sufficient distance above roller 6 to permit feed rollers 9 and 10 to pass there between, roller 8 and roller 5 simultaneously being disposed below and above rollers 9 and 10 respectively, thereby permitting feed rollers 9 and 10 to pass along guides 41 above roller 8, below roller 7, above roller 6, and below roller 5 until feed rollers 10 reach the point of their travel that is closest to rack 2, whereafter feed rollers 9 and 10 grip cloth 1 and draw this up towards die table 12 in order to feed cloth 1 into the cutting process. A support plate 42 is adapted to lead and support cloth 1 from feed rollers 9 and 10 to cutting roller 13, and thereafter between rollers 13 and 16 as shown in FIG. 1. A wide, longitudinal slot 42a is formed through plate 42 to permit roller 13 to extend therethrough and to be in full and free contact with cloth 1 at all times.

Endless belt 17 is adapted to support cloth 1 during transition from secondary cutting roller 16 to drum 20.

A compressed air conduit 43 is located on frame 23, transversely of upper surface of die table 12, substantially directly above belt 17, die table 12 being penetrated by a plurality of holes substantially perpendicular to lower surface 11, compressed air from conduit 42 being blown through said holes, the force of compressed air being adapted to release cloth 1 from any binding action that blades 14 might exert thereon and force cloth 1 into contact with belt 17 for transport of cloth 1 onto drum 20 preferably cloth 1 is received over drum 20 as in FIG. 2 whereby the cut cloth undergoes folding only to the same radius as drum 20, to avoid the more abrupt folding about roller 19 inherent when cloth 1 is received over drum 20 in the manner of FIG. 1.

Drum 20 is on its outer surface supplied with a plurality of perforations, adapted to permit a vacuum chamber located within drum 20, adjacent to the transport side of drum 20, to exert a vacuum on cloth 1, thereby forcibly causing cloth 1 to adhere to the surface of drum 20 during transition of cloth 1 from belt 17 to the lowest point 22 of drum 20, at which location the vacuum is broken and a stream of compressed air ejected through perforations located on 20, forcibly releasing cloth 1 from drum 20, permitting cloth 1 to be deposited on a receiving pallet 21 removably located on depositing table 44.

Depositing table 44 is adapted to move in longitudinal direction, parallel to direction of movement of die table 12, depositing table 44 being motivated in forward and reverse movement by pinion 45 acting on rack 46, located on lower portion of depositing table 44, pin 45 being adapted to selectively motivate depositing table 44 in a direction and at a speed suitable to permit smooth and even lay down of cloth 1 onto depositing table 44 in layers as cut off by a transverse cutting blade 47 located at rear end of die table 12, cutting blade 47 being adapted to entirely sever cloth 1 in a transverse direction.

A drive spindle 48 is adapted to drive pinions 26 and 45 at identical speeds through conventional clutch and gear box means, to provide forward speed of die table 12 identical to forward speed of depositing table 44, off-set means between forward motion cycles being provided in conventional manner to ensure that cloth 1 is laid down and stacked on depositing table 44 as each consecutive portion of cloth 1 is cut and severed by blades 14 and blade 47.

Depositing table 44 is supplied with a scissor like system of legs adapted to raise or lower depositing table 44 as required in conventional manner, automatic lowering means being incorporated to provide lowering of depositing table 44 for a distance equal to the thickness of each layer of cloth, as each cutting cycles is completed.

It will be noted that one end 49 of scissor leg 50 is hingeably attached to one end of depositing table 44, a corresponding end 51 of scissor leg 52 being attached to undercarriage 53 of depositing table 44. The upper end 54 of leg 52 is adapted to be freely rollable on the undersurface of depositing table 44, while the lower end 55 of leg 50 rests upon undercarriage 53 and is moveable thereover by means of an automatic mechanism to be hereinafter described under FIG. 4. This system will ensure that the vertical relation of hinge location 49 of depositing table 44 maintains a constant vertical relation with hinge point 51 of undercarriage 53, and thereby also maintains a constant vertical relation with die table 12 independently of vertical position of receiving table 21. A rotary bolt rack 56 is located above rack 2, rotary rack 56 being adapted to receive and hold a plurality of bolts of cloth, each bolt of cloth having its free end adapted to be placed on a separate shelf on rack 2, from which feed rollers 9 and 10 may pick up said free end upon this so being desired.

Rack 2 is adapted to move vertically, to selectively align any desired shelf with pick up location of feed rollers 9 and 10, for dispensing of cloth thereon. An electrically driven rack and pinion mechanism 2a is illustrated in FIG. 2 adapted to effect this vertical adjustment, any other conventional adjustment means, however, would be equally acceptable.

A plurality of shelves 57 and 58 are located in frame 23, adapted to hold thrown cloth, the free ends of the thrown cloth being adapted to be inserted in shelves in rack 2 for pick-up feed rollers 9 and 10.

A security switch 60 comprising a gravity or spring loaded roller, resting on cloth 1, is adapted to stop the cloth cutter upon undue tension or breakage being encountered in the cloth.

A photo cell system comprising a light source 61 and a photo cell 62, adapted to move substantially transversely of longitudinal direction of cloth 1, are located one on each side of cloth 1, photocell 62 being adapted to consecutively contact a plurality of switch elements adapted selectively and synchronously therewith to permit actuation of a plurality of friction rollers 62a through electric motor means upon photo cell 62 optically sensing misalignments of cloth pattern, said friction rollers being adapted to increase feeding speed of individual portions of feed rollers 9 upon misalignment of pattern in cloth 1 being encountered.

A second set of photocell controlled feed rollers 63 and 64 is controlled by a second set of light source 65 and photocell 66 located, adjacent to and in close proximity of light source and photo cell 61 and 62 respectively.

Photocells 62 and 66 may be adapted to actuate a braking system on each of above mentioned friction rollers such as for instance magnetic brakes, instead of electric motor means, photocells 62 and 66 thereby being adapted to slow down the movement of individual portions of cloth 1 instead of speeding up such movements.

Feed rollers 63 and 64 and light sources 61 and 65 together with photocells 62 and 66 are hingeably located in frame 23 and are adapted to swing away from cloth 1, upon it being required to move feed rollers 9 and 10 down toward rack 2.

Figure 3:
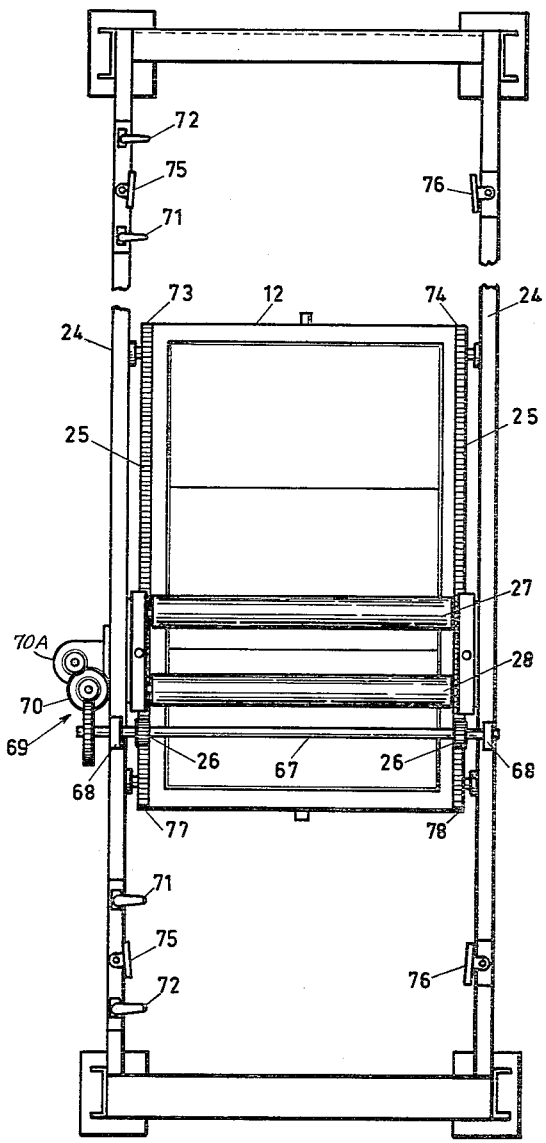
FIG. 3 is a plan view of the cloth cutter shown in FIGURE 2.

Referring to FIG. 3 a top plan view of the cloth cutter is illustrated showing a particular method of controlling movement of the die table 12 longitudinally within upper beams 24. Longitudinal motion is imparted to die table 12 through rack 25 and pinion 26 through axle 67 located in bearings 68 on beams 24, and driven through worm and wheel means shown at 69 and through reduction gear 70 by conventional motor means 70A.

A series of switch means 71 and 72 are adapted to stop rotation of motor means 70A and reverse direction of rotation of motor means 70A respectively, in conventional manner.

As die table 12 travels towards one end of the cloth cutting machine, edge 73 of die table 12 will strike switch means 71, deflecting this to one side whereby a circuit internally of switch means 71 is adapted to be broken, this circuit being in electrical connection with motor means 70A and adapted to stop rotation thereof. As die table 12 progresses further toward one end of the cloth cutting machine, edges 73 and 74 will contact tapered braking surfaces 75 and 76 which may be spring loaded to exert pressure on edges 73 and 74, thereby gradually bringing die table 12 to a stop by taking up the inertia imparted thereto by motor means 70A. Upon edge 73 reaching switch means 72 and deflecting this, a circuit within switch means 72 is adapted to be closed, such circuit being adapted to start up motor means 70A in reverse direction, adapted to motivate die table 12 back toward the opposite end of the cloth cutting machine where the same procedure will repeat itself with edges 77 and 78 of die table 12.

It will be understood that a plurality of switch sets similar to switches 71 and 72 may be located along upper beams 24, adapted to be actuated by die table 12 to provide proper sequential movement of depositing table 44 in relation to movement of die table 12, to provide correct time lag required between longitudinal movement of die table 12 and corresponding longitudinal movement of depositing table 44 to provide correct depositing of cloth 1 thereupon.

Figure 5:
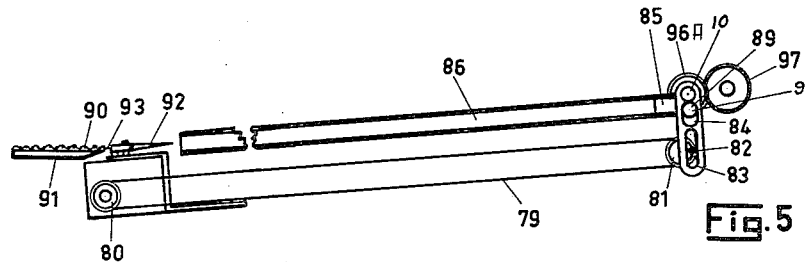
FIG. 5 is a detail side elevation of the feed mechanism illustrated in FIGURE 4.
Figure 4:
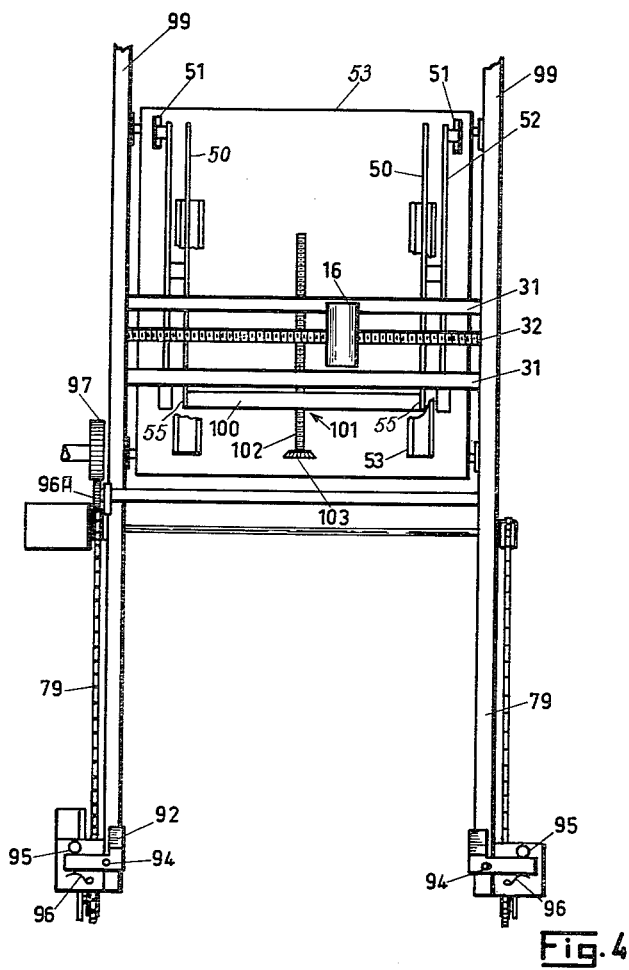
FIG. 4 is a plan view of the cloth cutter illustrated in FIGURE 2, shown with the top movable platen removed, illustrating particularly the general feed mechanism embodied in this invention.

Referring to FIG. 4 and FIG. 5 the general cloth feeding mechanism embodied in this invention is illustrated comprising an endless chain 79 located on sprockets 80 and 81, chain 79 being at one location supplied with a tooth 82, attached to chain 79 and disposed in a direction perpendicular to a plane containing chain 79, tooth 82 being adapted to locate slideably within elongated slot 83 located in a lever 84 that is attached to end bearing housing 85 located on each side of the cutting machine. Housings 85 are adapted to slide longitudinally in guides 86. Two feed rollers 9 and 10 are located transversely of cloth with their ends rotatably carried by housings 85, feed rollers 9 and 10 being adapted to be moved slideably toward or away from each other, feed rollers 9 and 10 being motivated toward each other, through conventional spring means 89.

Chain 79 is intermittently and controllably operable through clutch means or other conventional actuating means in conjunction with sprockets 80 and 81, to permit chain 79 to controllably move on sprockets 80 and 81, thereby causing tooth 82 to travel between sprockets 80 and 81, and motivate lever 84, through action of tooth 82 in slot 83, to travel toward sprocket 80 upon it being required to pick up cloth end 90 from rack shelf 91, in order to start feeding operation of cloth end 90 into the cloth cutting machine.

Upon feed rollers 9 and 10 reaching wedge 92, they will be actuated apart from each other, feed roller 9 traveling above wedge 92 whereas feed roller 10 will travel below wedge 92, rollers 87 and 88 thereby being separated from each other as they travel toward the blunt end 93 of wedge 92 whereafter rollers 87 and 88, upon passing blunt-edge 93 will be forced together by means of spring action derived from spring 89. Cloth end 90 located directly adjacent to end 93 will thereby be grasped by rollers 9 and 10 as tooth 82 travels over sprocket 80 and begins its return journey towards sprocket 81. Wedge 92 is pivotably attached to the frame of cloth cutter at 94, wedge 92 being adapted to rotate toward sprocket 81 around pivot 94, counter rotation of wedge 92 being limited by stop 95. Upon return of tooth 82 toward sprocket 81, housing 85 will be drawn toward sprocket 81 by lever 84, rotating wedge 92 out of actuating position until housing 85 has passed wedge 92 entirely, whereafter spring 96 will return wedge 92 to actuating position against stop 95.

As housing 85 progresses toward sprocket 81, cloth end 90 will be drawn toward die table 12 until planetary gear 96A, that is attached to one end of feed roller 9, engages with feed gear 97 in the extreme forward position of housing 85, whereafter feed roller 9 will start to rotate upon it being required to feed cloth end 90 into the cloth cutting operation.

Rotation of feed gear 97 is controlled by movement of die table 12, switch means 72 being adapted to commence rotation of feed gear 97 upon die table 12 having reached its maximum return stroke and commencing its forward cutting stroke.

Referring particularly to FIG. 4 a transverse cutting roller 16 is shown together with guides 31 and transverse spindle 32 adapted to motivate roller 16 in reciprocating motion transversely of longitudinal direction of die table 12. Spindle 32 may comprise a right hand and a left hand thread superimposed on each other, the ends of each thread being in contact with the counter-directional thread comprising an endless thread running back and forth along spindle 32, adapted to transport a suitable nut back and forth thereon, the nut being in connection with roller 16, or other conventional methods of providing reciprocating motion to roller 16 may be employed such as "Whitworth Box" or the like.

Carriage 98, adapted to roll within lower frame members 99, carries scissor legs 50 and 52, that at their upper ends are adapted respectively to be attached to and roll under depositing table 44, which is not shown in this figure. Lower ends of scissor legs 50 are swivelably attached to the two ends of cross bar 100, which, intermediate of the two ends thereof, contains a threaded hole at 101 adapted to threadedly receive threaded spindle 102 adapted through gear means 103 to motivate bar 100 toward or away from ends 51, thereby raising or lowering depositing table 44 as required.

Figure 6:
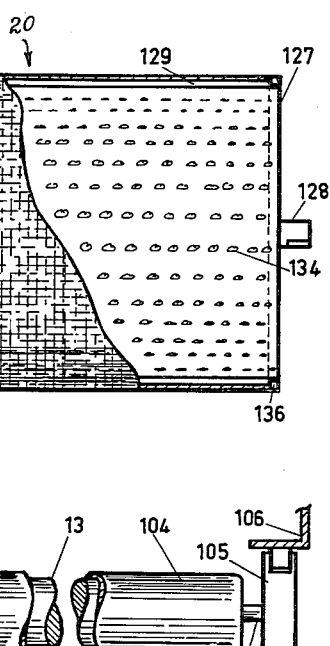
FIG. 6 is a fragmentary side elevation of the stationary, transversely located, spring loaded cutting roller.
Figure 7:
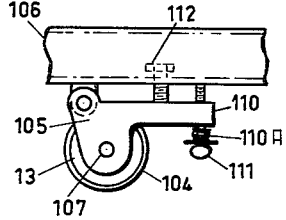
FIG. 7 is a fragmentary and elevation of the spring loaded cutting roller shown in FIGURE 6.

Referring to FIG. 6 and FIG. 7 stationary roller 13 is shown having located thereon an outer, resilient covering 104 adapted to facilitate cut-through of the cloth 1 as die table 12 passes thereover without danger of dulling the cutting blades located on die table 12, through contact with a hard surface on roller 13.

A bearing carrier 105 is hingeably attached to frame 106 of the cloth cutter at each end of roller 13, bearings 107 being adapted to rotatably carry spindles 108 and 109 located centrally and axially of each end of roller 13.

One end 110 of bearing carrier 105 is supplied with spring means 110A adapted to tension free end 109 towards frame 106 thereby tensioning roller 13 towards cutting blades 14. Adjustment bolts 111 are threadedly located in frame work 106 and adapted to controllably vary tension on spring 110A. A stop screw 112 is threadedly located in frame 106, adapted to controllably limit upward motion of free end 110, and thereby upward motion of roller 13 towards die table 12.

Figure 8:
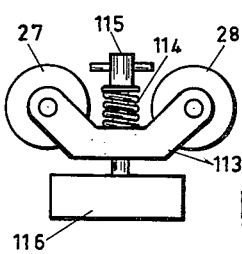
FIG. 8 is a side elevation of two transversely located, spring loaded pressure rollers adapted to take up the cutting pressure exerted by cutting rollers on underside of die-plate.

Referring to FIG. 8, the method of taking up cutting pressure exerted by cutting rollers on under side of die plate 12 is shown comprising two transversely located spring loaded pressure rollers 27 and 28 rotatably carried in bearing yokes 113, rollers 27 and 28 being controllably and pressurably disposed downward toward die plate 12 by compression springs 114 located on adjustable tension means 115, that are threadedly received in bracket 116 attached to upper beams 24 of the cloth cutter.

Figure 9:
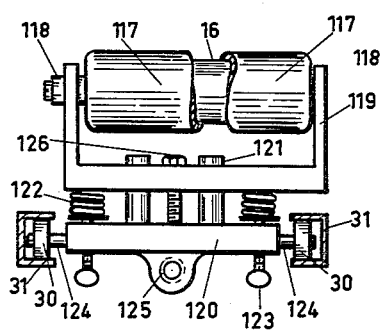
FIG. 9 is a fragmentary part sectional side elevation of the transversely movable, reciprocating cutting roller embodied in the invention.

Referring to FIG. 9 transversely movable roller 16 is shown having externally thereof a coating 117 of resilient material. Roller 16 is rotatably carried in bearings 118 of yoke 119 that is guideably located on carriage 120 by means of dowels 121 rigidly and perpendicularly attached to carriage 120, dowels 121 being axially slideable in a corresponding plurality of holes located in yoke 119.

The plurality of compression springs 122 are located between carriage 120 and yoke 119, springs 122 being adapted to be variably tensioned through screw means 123, threadedly located in carriage 120.

Carriage 120 is supplied with a plurality of wheels 30, rotatably located on axles 124, wheels 30 being adapted to roll in guides 31 upon carriage 120 being controllably actuated to reciprocate transversely of longitudinal direction of the cloth cutter by threaded actuating means adapted to move in nut 125. Upward movement of yoke 119 is adapted to be adjustably limited by stop screw means 126, threadedly located in carriage 120.

Figure 11:
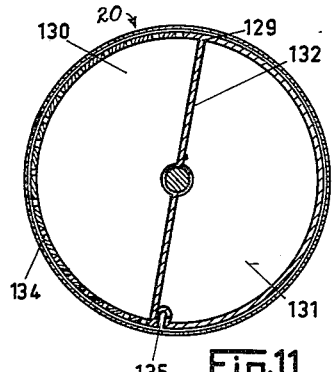
FIG. 11 is a sectional view of the transporting and depositing drum shown in FIGURE 10, taken on the line 11—11.
Figure 10:
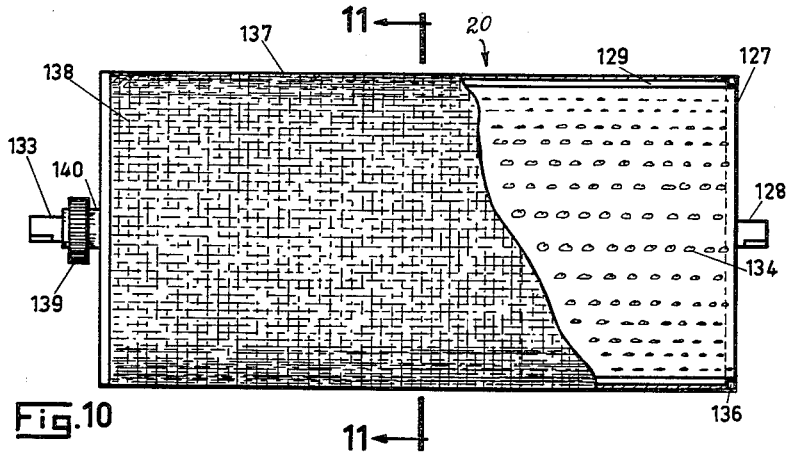
FIG. 10 is a fragmentary, part sectional, plan view of a vacuum transport and pressure deposit roller embodied in this invention.

Referring to FIG. 10 and FIG. 11 vacuum transport- and pressure-deposit drum 29 is shown comprising a drum 127 rotatably located on stationary spindle 128. A secondary drum 129 is slideably located within drum 127, drum 129 being rigidly attached to spindle 128 and divided into two compartments 130 and 131 respectively by a partition 132 located diametrically across drum 129.

Both ends of chambers 130 and 131 are sealed by end closures, compartment 130 being connected to a vacuum pump through a hollow axle portion 133, whereas compartment 131 is connected to a blower through a hollow axle portion 128.

Compartment 130 is supplied with a plurality of perforations 134 located in the circumferential wall of compartment 130. Compartment 131 is at the lower end thereof provided with a slot 135 extending substantially for the full axial length of compartment 131, slot 135 providing outlet means for the pressurized air contained in compartment 131.

Rotatable drum 127 comprises a cylinder 137 slideably and concentrically located over drum 129 the aperture between cylinder 137 and drum 129 being sealed at each end thereof by means of slideable seals 136. Cylinder 137 is supplied with a plurality of slits 138 of substantially narrow width, adapted to admit external atmosphere to compartment 130 upon pertinent slits 138 being located opposite perforations 134; conversely, to permit exhaust of air from compartment 131 through slits 138 upon these being located opposite slot 135.

Rotation of drum 127 on stationary axle 128 is transferred from conventional motor drive means through gears 139 attached to collar 140 of drum 127.

Cylinder surface 137 may be covered with fine gauze or cloth of sufficient porosity to permit transfer of air therethrough, sufficiently to provide vacuum holding means for cloth located over circumferential surface of compartment 130, and conversely to permit sufficient discharge of air therethrough from slot 135 to loosen and discharge cloth from surface of cylinder 137, upon pertinent surface of cylinder 137 being located directly opposite slot 135.

Figure 12:
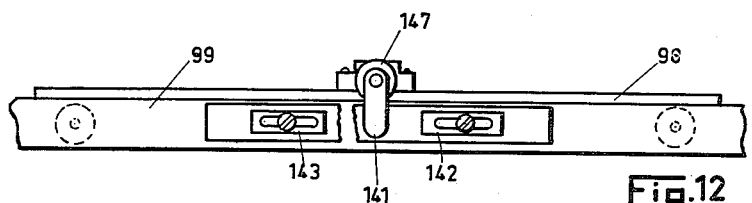
FIG. 12 is a fragmentary side elevation of the adjustable lowering mechanism located on the lower frame of the cloth cutter adapted to consecutively lower the depositing table embodied in this invention.
Figure 13:
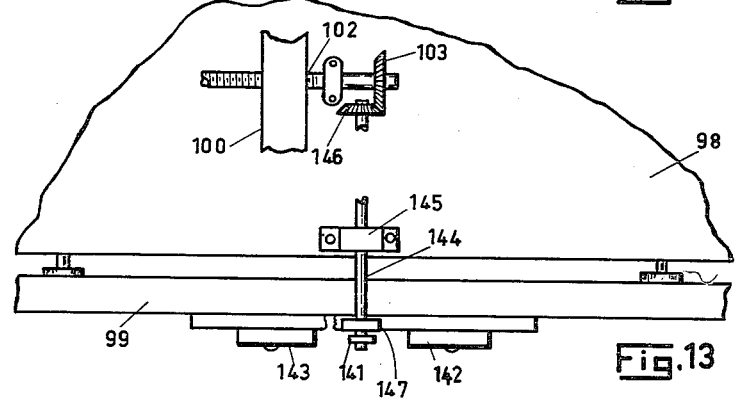
FIG. 13 is a fragmentary plan view of the automatic height adjusting system utilized in the receiving table embodied in this invention.

Referring to FIG. 12 and FIG. 13, the method of applying ratchet impulse to vertical movement of table 44 is shown comprising an actuating lever 141 adapted to be contacted by adjustable stops 142 and 143 at end of forward and return stroke respectively, lever 141 being connected to spindle 144, carried in bearing 145 located on carriage 98, through ratchet means 147. Bevel gear 146 rigidly located on end of spindle 144 is adapted, through conventional ratchet mechanism 147 to actuate bevel gear 146 to rotate in one direction upon lever 141 striking one or both of stops 142 and 143, bevel gear 146 thereby causing intermittent rotation of bevel gear 103, that is rigidly attached to spindle 102, which is threadedly received in cross bar 100.

Rotation of spindle 102 will cause lower extremities of scissor legs 50 and 52 in FIG. 2 and FIG. 4 gradually to spread apart, thereby gradually lowering depositing table 44, such vertical lowering of table 44 being adapted to be adjustably regulated in accordance with thickness of cloth being deposited thereon.

Manual or motorized rotation means may be applied to axle 144 for fast raising or lowering of depositing table 44 after discharge of fully-loaded pallet therefrom and the like.

Figure 14:
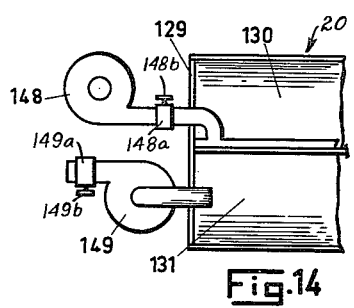
FIG. 14 is a diagrammatic side elevation of the transporting drum shown in FIGURE 10, illustrating in particular the method of providing independently operable suction and pressure sections within two chambers of the transport drum respectively.

Referring to FIG. 14, a schematic diagram of the suction and pressure sections of drum 129 is shown, illustrating utilization of separately operated vacuum pump 148 and blower 149, adapted to supply compartments 130 and 131, it being deemed necessary to employ two separate units rather than to utilize inlet and outlet of the same pump to provide pressure and vacuum means on drum 129, in order to make pressure and vacuum in compartments 130 and 131 respectively independent of each other.

It will be obvious that a high vacuum created in compartment 131 would slow down exit of pressurized air from the pump to compartment 130, thereby perhaps not supplying sufficient air pressure to ensure correct depositing of cloth on depositing table 44, conversely high back pressure in compartment 130 would be apt to reduce the vacuum in compartment 131 to a stage, where vacuum created there would be insufficient to hold cloth firmly on to drum 129 during transporting process thereof. A metering valve 148a is located in the vacuum line between vacuum pump 148 and compartment 130 and is operable by a handle 148b to control the vacuum applied to said compartment. This mechanism is necessary to allow for various qualities and textures of cloth which may be passed through the machine, each having different permeability properties; those with less permeability requiring less vacuum to hold them on the outer surface of drum 127 and, conversely, those with greater permeability requiring more vacuum to hold them in place. For greater convenience, handle 148b may have indicating means attached thereto to show the required valve setting for each type of cloth used.

Similarly, a valve 149a operable by a handle 149b is adapted to control the pressure of air from blower 149 into compartment 131, the setting of handle 149b again depending on the type of cloth passing through the machine, less pressure being required to eject a substantially impermeable material than one with a higher degree of permeability. Handle 149b may also have indicating means showing the required setting for each type of cloth used.

Figure 15:
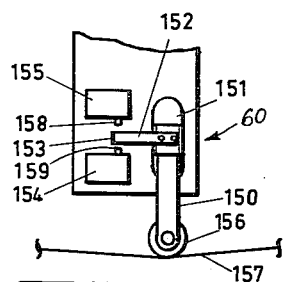
FIG. 15 is a fragmentary side elevation illustrating the method of utilizing a security switching apparatus adapted to stop the mechanism upon excess tension or breakage being encountered in the cloth.

Referring to FIG. 15, security switching apparatus 60, as illustrated in FIG. 2 is shown comprising a vertically slideable lever 150, slideably located in groove 151, lever 150 having attached, substantially perpendicularly thereto, a switch lever 152, free end 153 of switch lever 152 being located between two button switches 154 and 155, upon roller 156, rotatably located at free end of lever 150, resting on cloth 157 in normal operating condition.

Upon cloth 157 being unduly tensioned lever 150 will be lifted up to a position where free end 153 will press on button 158 of switch 155 and cause the cloth cutter to stop operation, thereby permitting an operator to investigate reason for undue tension of cloth 157 before error or damage results from such undue tensioning.

Upon undue lack of tension in cloth 157, for instance through breakage thereof, gravity will cause lever 150 to sink downwards causing switch lever 152 to press on button 159 of switch 154, thereby causing the cloth cutter to stop operation, permitting the operator to make any required adjustments.

Referring to FIG. 16 and FIG. 17 details of die table 12 are shown, illustrating particularly how change of patterns, etc., may be effectuated by locating an internal swiveable table within an outer frame 160, die table 12 being adapted to be swivelled on pivots 161 and 162 in order to permit reversing of die table 12, and thereby facilitating changing of patterns, etc. thereon.

Die table 12 may comprise a plurality of sections such as shown as 163, 164, 165 to facilitate change of pattern on one part of the die face of die plate 12 while the rest of the die face is being utilized for cutting operations. Sections 163, 164 and 165 are removably located in die table 12 and supplied with a plurality of threaded holes 166 adapted to be utilized in fastening a plurality of cylindrical cutting blade bases 167 which are adapted to be removably located in counter sunk cylindrical cavities 168. Cutting blade bases 167 are adapted to adjustably receive and hold cutting blade holders 169 in variable positions adapted to permit location of cutting blades 170 in any required pattern.

Stop means 171 are provided in frame 160 adapted to permit die table 12 to be held in two alternate reversible positions.

Die table sections 163, 164 and 165 may be removed from die table 12 upon die table 12 being swivelled to a position in which cutting blades 170 are brought to face upwards, whereafter other replaceable sections, already supplied with other required cutting blade patterns may be located on die table 12.

Transverse cut-off blade 47 is located at the extreme rear end of die table 12, cut-off blade 47 being adapted to shear cloth 1 transversely for its entire width upon the complete plurality of patterns located on die table 12 having been cut through cloth 1, prior to non-cutting return stroke of die table 12.

Referring to FIG. 18, FIG. 19 and FIG. 20, details of one configuration of a cutting blade holder adapted to be utilized in conjunction with the present invention are shown comprising blade holder base 167 adapted to be attached to die table 12 by means of screw 173.

Transversely of upper exposed surface 174 of base 167, is located a groove 175, situated diametrically across surface 174, groove 175 being adapted to slideably receive an elongated cutting blade holder 169 having a slot located therein perpendicular to direction of slideable movement of blade holder 169 in groove 175. Cutting blade holder 169 is supplied with an elongated slot 176 having a counter sunk face 177 adapted to slideably receive cylinder head screw 178, that is adapted to be utilized in adjustably fastening cutting base holder 169 to base 167. Cylinder head of screw 178 is adapted to be contained completely within counter sunk face 177.

Slot 179 is substantially wider than thickness of cutting blade 170, cutting blade holder 169 being supplied with two screws 180 as shown, adapted to impinge on sides of cutting blade 170 and locate and hold this in a required position within slot 179.

Referring to FIG. 21, FIG. 22 and FIG. 23 an alternate configuration of a cutting blade holder, utilized in this invention, is shown made from flat strip material, comprising a straight portion 181 containing a longitudinal slot 182 therein, upper edges of slot 182 being counter sunk for a part of the thickness of the cutting blade holder 185 as shown at 183 to receive complete head of a cylindrical head screw 184, adapted to be utilized in fastening cutting blade holder 185 to die table 12.

The other end of strip portion 181 is bent upwards substantially perpendicular to strip portion 181 and doubled back upon itself in a double hairpin bend as shown to provide a groose-necked configuration having a close fold 186, and an open fold providing a slot 187 adapted to slideably and fastenably receive cutting blade 170, adapted to be held therein by fastening screw 180.

Referring particularly to FIG. 23 a modified configuration of this particular cutting blade holder 185 is shown having a wide slot 187A located therein, adapted to slideably receive and hold two adjacently located cutting blades 170 and 170A, cutting blades 170 and 170A being bevelled on one side only to provide cutting edge 188, non-bevelled sides of cutting blades 170 and 170A being located adjacent to each other to provide a single mutual cutting edge 188 at cross-over points in patterns requiring cross-over of two cutting blade lines.

Referring to FIG. 24, the braking system, utilized in arresting the inertia of die table 12 at end of travel thereof, is illustrated, comprising a friction member 189, located on each side of die table 12 substantially towards each end thereof, friction member 189 being adapted to slideably contact pivotable brake shoe 190, supplied with spring means 191 adapted to provide progressively increasing brake pressure on friction member 189, thereby consuming inertia of die table 12 sufficiently to permit die table 12 to reverse direction of motion, upon contacting switch means 71, without undue stress on reversing motor means.

Figure 25:
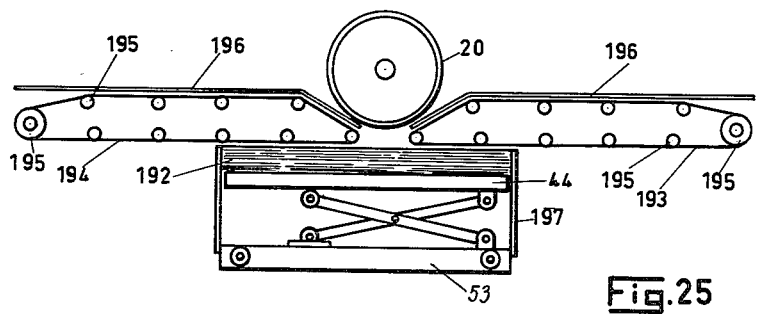
FIG. 25 is a part sectional side elevation of a protective device adapted to be utilized in conjunction with the depositing table shown in FIG. 2.

Referring to FIG. 25, a protection device, adapted to protect the stacked layers 192 of cloth, located on depositing table 44, against external influence during operation of the cloth cutter, such as for instance wind, dust, etc. is shown comprising two systems of endless bands 193 and 194 located one on each side of drum 20, endless bands 193 and 194 being rollably located over a plurality of guide rollers 195, adapted to permit bands 193 and 194 to be motivated in direction parallel to direction of movement of depositing table 44, motivating power being derived from main power source. Deposited cloth thereby at all times being protected against upsetting due to rapid change of direction of receiving table and other external influences such as dust, lint, etc. Bands 193 and 194 may also be driven from a main power source in cases where the texture and body of the cloth is such that it would be upset by the rapid change of direction of the depositing table 44. Shields 196 may be located above belts 193 and 194 to prevent dust, etc. from settling on upper surfaces thereof and being transferred to cloth layers 192 as belts 193 and 194 move thereover.

A box-like structure 197 adapted to protect cloth layers 192 against influence of wind and the like along the sides thereof may be located on carriage 53 around the sides of depositing table 44, box structure 197 stretching from carriage 53 upwards substantially to bands 193 and 194, ends or sides of box structure 197 being detachable to permit removal of cloth layers 192 from depositing table 44 as required. Depositing table 44 is adapted to be raised or lowered vertically within box structure 197.

Figure 26:
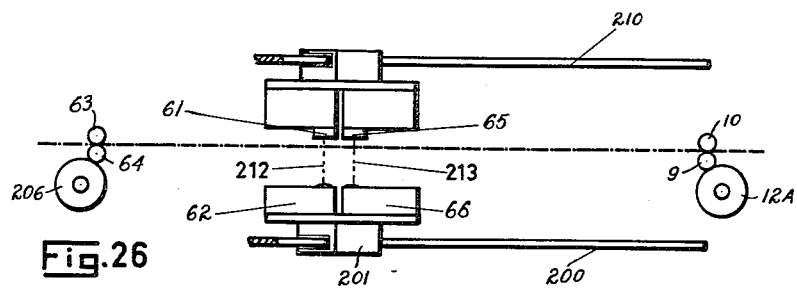
FIG. 26 is a side elevation of a photo cell mechanism adapted to be utilized in conjunction with a feed control mechanism incorporated in this invention.
Figure 27:
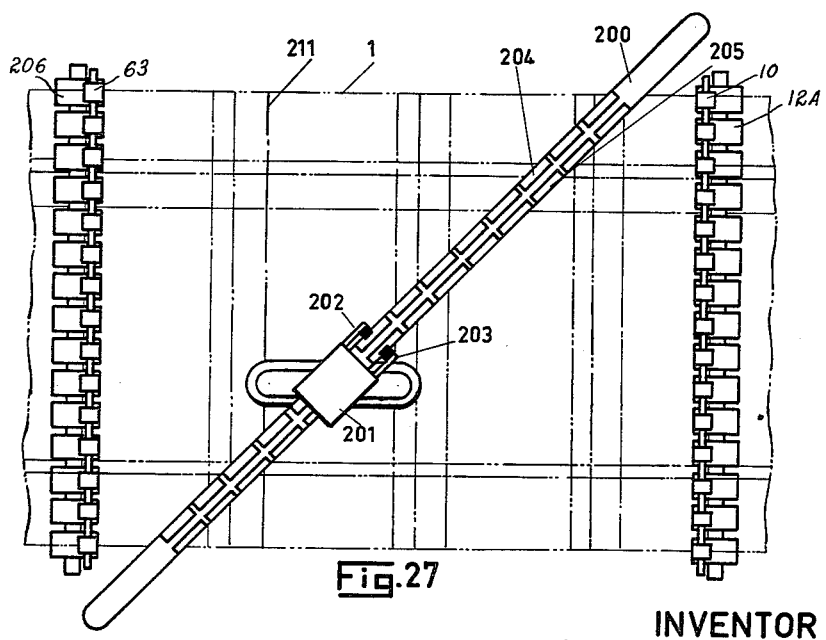
FIG. 27 is a plan view of the photo cell mechanism and feed control mechanism shown in FIG. 26.

Referring to FIG. 26 and FIG. 27, detailed view of photo cell cloth feed control mechanism illustrated in FIG. 2 is shown, comprising photocells 62 and 66, carried in photo cell carriage 201, adapted in conventional manner to travel along guide rail 200 with a reciprocating motion, linear speed of photo cell carriage 201 in direction parallel with longitudinal movement of cloth 1, being equal to longitudinal speed of cloth 1, contact brushes 202 and 203 of photo cells 62 and 66 respectively being adapted to consecutively contact a plurality of control contact pairs 204 and 205 respectively, each contact pair being adapted to controllably actuate rotation or retardation of friction roller portions 206 and 12a respectively in conventional manner the former being in frictional contact with feed roller 64 and the latter with feed roller 9 as described. Photo cell light sources 61 and 65 are adapted to move on rail 210 synchronously with photo cells 62 and 66.

Upon a transverse pattern line 211, decided either by the weft or by pattern densities of cloth 1 having a portion thereof sag behind the general mobile speed of cloth 1, such portion will interrupt light ray 212, provided that pattern line 211 is previously located between light rays 212 and 213, emanating from light sources 61 and 65 respectively, and provided that pattern line 211 is of a density or colour adapted to actuate photo cell 62, through pertinent contact 204, to provide speed-up action on friction roller portion 12a.

Upon a portion of pattern line 22 being stretched forward of the general speed of cloth 1, providing a forward loop in pattern line 211, such loop portion will interrupt light ray 213, thereby actuating photo cell 65, through contact 205, to provide retarding action on feed roller portion 206, through magnetic breaking action or the like, thereby bringing looped portion of pattern line 211 back into location between light ray 212 and 213.

Figure 28:
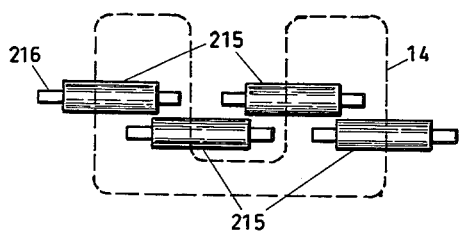
FIG. 28 is a reverse plan view of alternate method of utilizing primary roller means in this invention.

Referring to FIG. 28 an alternative primary roller configuration is shown comprising a plurality of alternately staggered parallel situated overlapping rollers 215, located in place of primary roller 13 in FIG. 2, each of rollers 215 having each end bearing 216 independently biased towards cutting blades 14, thereby providing each individual roller 215 with independent self aligning features ensuring constant and complete contact with cutting surfaces on blades 14.

Figure 29:
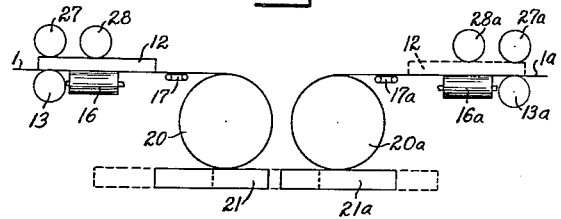
FIG. 29 is a diagrammatic sketch of a method of utilizing one die table to serve two machines embodying the present invention.

Referring to FIG. 29, die table 12, by conventional mechanism, may be cause to continue into travel over drum 20 at the termination of its cutting stroke to pass over a second drum 20a and between a second set of rollers 13a, 16a, 27a and 28a in order to cut out another series of patterns in cloth 1a, which thereafter passes over an endless belt 17a onto drum 20a prior to being deposited on a receiving pallet 21a. Die table 12 is synchronized with pallet 21a as well as with pallet 21 and it will be understood that the mechanisms previously described and those described in this paragraph are substantially identical and closely juxtaposed in order to hold the shuttling action of die table 12 down to a minimum.

In operation a bolt of cloth mounted on rotary bolt rack 56 has its free end introduced to one of the shelves in rack 2. Link arm 38 is actuated in a horizontal direction so as to pivotally rotate levers 36 and 35 in a clockwise direction about pivot centers 39 and 40 respectively, thus disposing roller 7 substantially above roller 6 sufficient to enable feed rollers 9 and 10 to pass therebetween, roller 8 and roller 5 simultaneously being disposed below and above rollers 9 and 10 respectively thereby permitting feed rollers 9 and 10 to pass along guides 41 above roller 8, below roller 7, above roller 6 and below roller 5, feed rollers 9 and 10 reaching to their full extent of travel to rack 2. Cloth 1 is then gripped between feed rollers 9 and 10 and drawn upwards to die table 12. Support plate 42 then leads cloth 1 from feed rollers 9 and 10 to cutting roller 13. Link arms 38 is then returned to its original position, cloth 1 traversing rollers 5, 6, 7 and 8. Upon the machine being motivated, feed rollers 9 and 10 draw cloth 1 therebetween, introducing the cloth between cutting surface 11 of die table 12 and cutting roller 13. Die table 12 which is located on the "rack" side of roller 13 and above feed mechanism then moves forwardly and in a longitudinal direction toward drum 20, the longitudinal speed of die table 12 being adapted during its forward motion away from rack 2, to be identical to the speed imparted to cloth 1 by feed rollers 9 and 10. Cloth 1, upon passing between cutting surface 11 of die table 12 and cutting roller 13 is cut by blade 14 located on surface 11. During the travel of die table 12 to the end of its longitudinal forward pass secondary roller 16 is adapted to move transversely of the longitudinal direction of cloth 1 with a rapid reciprocating motion thus ensuring that the pattern cut in cloth 1 by blade 14 is cut clean through on all edges. As die table 12 moves forwardly, receiving pallet 21 also moves longitudinally forwardly in a synchronous manner, the speed of die table 12 and pallet 21 being identical. Cloth 1 which is sheared from the bolt length transversely by cutting blade 47, then passes over endless belt 17 onto drum 20 wherein it is retained by vacuum pressure until release point 22 is reached. Thereafter the cut sections of cloth 1 are transferred to receiving pallet 21, and it should be noted that the operation mechanism for the latter is timed to lag the operation die table 12 by a distance substantially equal to half the circumference of drum 20. It should also be noted that in utilizing the transfer mechanism illustrated in FIG. 1, die table 12 and pallet 21 move in the same direction on each stroke, while the arrangement as shown in FIG. 2 requires that table 12 and pallet 21 move in opposite directions.

Upon die table 12 completing its cutting stroke, cutting blade 47 is timed to shear cloth 1 transversely at feed rollers 9 and 10, leaving the end of cloth 1 engaged therebetween. A conventional disengaging mechanism, such as a ratchet or eccentric roller, is utilized to arrest the motion of rollers 9 and 10 during the return stroke of die table 12, thereby holding cloth 1 stationary until table 12 is positioned to commence another cutting stroke. At this point the end of cloth 1 which has been retained between rollers 9 and 10, is fed between the undersurface of die table 12 and pressure roller 13 to commence another feeding and cutting cycle.

It will be seen that, due to the vacuum operation of drum 20, the cut-out patterns 15 will be retained in position with the surrounding cloth 1 from which they were cut, and the tangential relationship between pallet 21 and drum 20 ensures patterns 15 and their surrounding cloth remaining together and flat, to be separated as required in subsequent operations.

Primary roller 13 and secondary roller 16 may be supported upon cam operated shafts adapted to hold said rollers in pressural contiguity with the undersurface of die table 12 during the cutting stroke of table 12 and to permit said rollers to be held below the undersurface of table 12 during the return stroke of the latter.

It will be understood that "cloth" in connection with the present invention covers any conventional type of material such as woven materials, knitted materials, pressed materials as for instance vinyl plastics, polyethylene and the like, leather, paper etc.

It will also be understood that a particular advantage of my invention lies in utilization of an inverted die table thereby permitting gravity to assist in release of cloth from die table after cutting operation.

The general design of the individual parts of my invention as explained above may be varied according to requirements in regards to manufacture and production thereof, while still remaining within the spirit and principle of my invention, without prejudicing the novelty thereof.

The embodiments of the invention in which I claim exclusive priority and privilege are defined as follows:

1. A cloth cutting machine comprising a frame structure, a substantially horizontal, elongate die table, guidably carried and longitudinally moveable within said frame, a plurality of cloth cutting blades adjustably and detachably attached, subjacent said die table, to the undersurface of said die table, a combination of a primary and a secondary, perpendicularly interrelated, cutting rollers, said primary cutting roller located below the undersurface of said die table, having its axis located stationarily and transversely of the longitudinally mobile direction of said die table, said primary cutting roller being rotatably carried in bearings hingeably attached to said frame, said bearings being pressurably disposed upwards towards said plurality of cutting blades by spring means, said secondary cutting roller located below the undersurface of said die table, having its axis located parallel to said longitudinal mobile direction of said cutting table, said secondary cutting roller being rotatably carried in bearings located in a transverse carriage, said transverse carriage being reciprocatingly moveably carried in guides parallel to said axis of said primary roller, said secondary cutting roller being presurably disposed upwards towards said cutting blades by spring means, said secondary cutting roller being actuated to consecutively reciprocate back and forth transversely of the lower surface of said die table, actuating means adapted to motivate said secondary cutting roller to reciprocate at a speed relative to longitudinal movement of said die table providing one complete reciprocating cycle, within a longitudinal movement of said die table that is shorter than the length of said secondary cutting roller, shelf rack means located at one end of said cloth cutting machine, two pairs of aligning rollers located transversely of said cloth cutter and between said shelf rack means and said primary roller, each of said pairs of aligning rollers being carried in bearings located in opposing extremities of centrally pivotable link arms, said two pairs of alignment rollers being carried in constant parallel relation to each other, said link arms being maintained in constant parallel relation to each other by levers attached to each of said link arms, said levers being linked by manually operable linkage means, feed roller means adapted to controllably feed cloth from said shelf rack means towards said cutting blades of said die table, cloth support-and-guide-means situated between said feed roller means and said primary cutting roller, cloth guide-and-support-means situated between said primary cutting roller and said secondary cutting roller, rotary rack means externally of said cloth cutting matchine located substantially above said shelf rack means, a plurality of holding means located on said rotary rack means, adapted to detachably receive and rotatably carry a plurality of bolts of cloth, shelf means located above said shelf rack means, adapted to dispensably receive stacks of thrown cloth, a rotatable drum, located subjacent said die table and adjacent said secondary cutting roller, said drum being rotatably carried on a stationary axle centrally thereof, said stationary axle being located horizontally and parallel to said axis of said primary cutting roller, a stationary cylinder located on said stationary axle, said stationary cylinder being located within and concentric with said rotatable drum, said cylinder being closed at both ends, a substantially vertical partition located within said cylinder, said partition dividing said cylinder into two separate compartments, connection between one of said compartments to vacuum means, connection between the other of said compartments to pneumatic pressure means, a plurality of perforations in the peripheral cylinder wall of said one compartment, a narrow, elongated aperture situated substantially parallel to said stationary axle, located substantially towards the lower extremity of said other compartment, a plurality of narrow, elongated perforations located in, and evenly distributed over the complete cylindrical surface of said rotatable drum, dynamic seal means between each end of said rotatable drum and each end of said stationary cylinder, controlling motivated endless belt means located between said secondary cutting roller and said rotatable drum, subjacent said cutting blades on said die table guiding said cloth onto said drum, two counter pressure rollers located substantially vertically above said primary cutting roller and said secondary cutting roller respectively, directly adjacent an upper flat surface of said die table, said counter pressure rollers being rotatably carried by said frame structure and pressurably disposed towards said upper surface of said die table, an elongate depositing table, located substantially subjacent said rotatatble drum, an elongated depositing table carriage, guideably carried and longitudinally moveable within the lower portion of said frame structure, said depositing table carriage being connected to said depositing table by adjustable leg means, adapted to maintain parallel relation between said depositing table and said depositing table carriage, independently of vertical position of said depositing table, synchronization means between said die table and said depositing table carriage adapted to controllably synchronize relative longitudinal motion between said die table and said depositing table, switch means located substantially towards each end of the upper portion of said frame structure, adapted to be actuated by each end respectively of said die table, said switch means being adapted to stop and reverse longitudinal motion of said die table and said depositing table in direct relation to each other, roller table means adapted to provide removal facilities for load of cut cloth from said depositing table, synchronized automatic lowering means adapted to lower said depositing table synchronously with depositing of layers of cloth thereon, and motor means adapted to controllably motivate mobile portions of said cloth cutting machine.

2. A cloth cutting machine as claimed in claim 1 in which said feed roller means comprises a pair of opposingly disposed, resiliently coated, feed rollers, having their axes parallel to each other and parallel to said primary cutting roller, feed roller guide rails located one at each end of said pair of feed rollers, said guide rails extending from locations substantially adjacent to said bearings of said primary cutting roller, towards close proximity of said shelf rack, said pair of feed rollers being carried in bearing housings, adapted to move longitudinally along said guide rails, elongated slot means in said housings adapted to slideably receive bearings of said feed rollers, spring means adapted to pressurably dispose said feed rollers towards each other, lever means extending from said housings, elongated slot means in said lever means located substantially in vertical, perpendicular relation to said guide rails, controllably motivated endless chain means located adjacent and parallel with each of said guide rails, sprocket wheels located at each end of said endless chains, spindle connection means between one sprocket of each of said chains, one tooth located on each chain sidewardly and outwardly disposed from said chain, said teeth being adapted to be slidingly received in said elongated slot of said lever, swivelable wedge means located at shelf rack end of each of said guide rails, pointed end of said wedge being adapted to temporarily separate said pair of feed rollers, one of said pair of feed rollers being adapted to traverse above said wedge, the other of said pair of feed rollers being adapted to traverse below said wedge, wide end of said wedge being located in close proximity of edge of a shelf of said shelf rack, said wedges being adapted to pivot in a plane parallel to a plane containing said guide rails, stop means located on said guide rails, adapted to locate and maintain longitudinal direction of said wedge in parallel relation to said guide rail, upon pressure being exerted from pointed end of said wedge towards wide end of said wedge, spring means adapted to dispose one end of said wedge towards said stop means, said wedge being pivotable to position outside return path of said pair of feed rollers towards said primary cutting roller, controllable actuating means adapted to motivate rotation of said feed roller during cutting stroke of said die table and arrest rotary motion of said feed rollers during return stroke of said die table, and operable means adapted to controllably motivate said chains to move through one complete cycle, said cycle starting with said tooth in extreme end position of said chain, in closest proximity to said primary cutting roller, gear means being located at one end of one of said pair of feed rollers, said gear means being adapted in said extreme end position, to engage with gear means adapted to rotate synchronously with motion of cutting stroke of said die table, said aligning roller link arms being adapted to rotate through substantially 90° away from the path of cloth, adapted to progress through said cutting machine, upon said pair of feed rollers being motivated along said guide rails, said link arms being adapted to automatically return into path of cloth, upon said pair of feed rollers reaching extreme end position in closest proximity to said primary cutting roller.

3. A cloth cutting machine as claimed in claim 1 in which said shelf rack is vertically adjustable in increments equal to a distance between a plurality of equally spaced shelves, located in said shelf rack, and releasable lock means, adapted to lock said vertically adjustable shelf rack in any of said vertical positions.

4. A cloth cutting machine as claimed in claim 1 in which compressed air ducts are disposed horizontally and transversely across top of said die table, vertically above said endless band means, said compressed air ducts being perforated along a surface directly adjacent to upper surface of said die table, said die table being supplied with a plurality of perforations extending substantially perpendicular to said upper surface, through the entire thickness of said die table.

5. A cloth cutting machine as claimed in claim 1 in which said longitudinal movement of said depositing table is controlled by independent switch means, adjustably located in upper portion of said frame structure, said independent switch means being adapted to be actuated by said mobile die table.

6. A cloth cutting machine as claimed in claim 1 in which said switch means, located at each end of said die table, are adapted to be adjustably located along upper portion of said frame structure, to provide controllable variation of length of stroke of said die table.

7. A cloth cutting machine as claimed in claim 1 in which said die table comprises a die table frame, having swivelably located thereon a die table body, said die table body being adapted to be swivelably located in either of two reverse horizontal positions, lock means inside of said die table frame being adapted to selectively lock said die table body in either of said horizontal positions.

8. A cloth cutting machine as claimed in claim 1 in which said primary cutting roller and said secondary cutting roller are supplied with resilient covering on the cutting surfaces thereof, said primary cutting roller and said secondary cutting roller being adapted to be automatically disengaged from contact with said cutting blade during return stroke of said die table.

9. A cloth cutting machine as claimed in claim 1 in which said vacuum compartment of said stationary cylinder is supplied by an independent vacuum pump and said pneumatic pressure compartment is supplied with compressed air from independent blower means.

10. A cloth cutting machine as claimed in claim 1 in which metering valve means are located on said connection means between said vacuum means and said vacuum compartment of said cylinder and between said pneumatically pressurized compartment and said blower means, operable handle means on each of said metering valves being supplied with markings indicating position of each of said metering valves, suitable to be utilized in conjunction with corresponding qualities and textures of cloth.

11. A cloth cutting machine as claimed in claim 1 in which switch means are incorporated comprising a vertically moveable, gravity-actuated roller adapted to rest on surface of cloth, traversing said cloth cutting machine, said gravity roller having a horizontal axis parallel to said axis of said primary cutting roller, said gravity roller being rotatably carried by a lever, a horizontal contact arm projecting from said level, said contact arm being suspendedly held between an upper and a lower switching mechanism during normal progression of cloth through said cloth cutting machine, said contact arm being adapted to actuate said upper switching mechanism to stop motion of said cloth cutting machine, upon undue tension in said cloth disposing said contact arm towards, and into contact with, said upper switching mechanism, said contact arm, upon undue lack of tension in said cloth, being disposed towards, and in contact with, said lower switching mechanism thereby actuating said lower switching mechanism to stop motion of said cloth cutting machine.

12. A cloth cutting machine as claimed in claim 1 in which said cutting blades are removably and adjustably attached to a plurality of cutting blade holders, each of said cutting blade holders comprising a slider of L-shaped configuration, having a horizontal and a vertical position, the horizontal position of said L-shaped configuration being adapted to be adjustably and slideably fastened to a cylindrical base portion by means of elongated slot means having counter sunk sides, through cylinder head screw means, said cylinder head being adapted to be completely contained within said countersunk sides of said slot, said base portion being adapted to be entirely contained within countersunk cylindrical cavities, evenly distributed over the complete surface of under side of said die table, said base portion being adapted to be fastened within said cavities by screw means located centrally of said base portion, said vertical portion of said slider containing a slot substantially perpendicular to sliding direction of said slider, said slot extending from a level contained in a plane, located in upper surface of said base portion, towards free end of said vertical portion of said slider, said slider having substantially centrally of and perpendicular to said slot two opposingly disposed screws, said slot being of a width somewhat larger than the thickness of said cutting blade, cutting edge of said cutting blade being bevelled on one side only, to provide a sharp cutting edge located within opposing side of said cutting blade.

13. A cloth cutting machine as claimed in claim 1 in which said cutting blades are held in a plurality of cutting blade holders, fastenably and adjustably attached to under surface of said die table, said cutting blade holders being formed from flat strip material, having a horizontal portion, supplied with an elongated slot, adapted to receive cylinder head screw means, adapted to detachably attach said cutting blade holder to the under surface of said die table, free surface of horizontal portion of said cutting blade holder being supplied with countersunk portions along edges of said slot, adapted to entirely contain cylinder head of said cylinder head screw means, one end of said horizontal portion of said cutting blade holder being bent up in direction perpendicular to said horizontal portion, for a distance less than the height of said cutting blade, said strip material thereafter being folded back on itself parallel to said perpendicular portion, for a length equal to said perpendicular portion, extreme end of said strip thereafter being doubled back upon itself for a length equal to said perpendicular portion, said last fold providing a slot of a width adapted to guidably receive two thicknesses of said cutting blade, screw fastening means being threadedly located in said extreme folded end, substantially centrally thereof and perpendicular thereto, threaded end of said fastening screw being adapted to exert fastenable pressure on side of said cutting blade, two adjacently situated cutting blades being adapted to be located in said cutting blade holder with bevelled sides facing away from each other to provide one common cutting edge.

14. A cloth cutting machine as claimed in claim 1 in which two endless band systems are located subjacent to said rotating drum, one on each side thereof, each of said endless bands being adapted to roll on a plurality of rollers having their axes parallel to each other and parallel to axis of said rotary drum, lower portion of said endless belts being contained in a common plane, said common plane being located directly above, and substantially in contact with upper surface of cut cloth deposited on said depositing table, said depositing table carriage being surrounded by a vertical wall structure, upwardly disposed from said depositing table carriage, substantially towards said common plane, sides and ends of said vertical wall structure being individually removably located on said depositing table carriage, shield means being located directly above each of said endless belts.

15. A cloth cutting machine as claimed in claim 1 in which a plurality of said cloth cutting machines are supplied in series, in combination with only one of said longitudinally moveable die tables.

16. A cloth cutting machine as claimed in claim 1 in which photo-cell control means are incorporated in conjunction with said feed rollers, said photo-cell control means comprising two photo-cell units, located on one side of cloth traversing through said sloth cutting machine, two co-related light sources located on other side of said cloth, said photo-cells and said light source units being adapted to be controllably motivated angularly across said cloth, a plurality of contact pairs being located along mobile path of said photo-cells, said feed rollers comprising a plurality of individual feed roller portions, frictionally connected to individual speed retarding or speed increasing means, said contact pairs being individually connected to said feed roller portions within same longitudinal direction parallel to longitudinal flow of said cloth, brush means connecting each of said photo-cells with each of said pairs of contacts, and actuating means adapted to reciprocate said photo-cells and said light source units synchronously with speed of said cloth, a set of retarding roller portions, similar to said feed roller portions being located at end of cloth prior to traversing said photo-cell unit, said set of retarding rollers and said photo-cells and light source units being adapted to be pivotally dislocated from operating position upon it being required to change said cloth.

17. A cloth cutting machine as claimed in claim 1 in which a plurality of photo-cell units are located in two parallel, adjacently disposed rows, transversely of one side of cloth traversing said cutting machine, in combination with two co-related parallel rows of light source units located on opposite sides of said cloth, each of said photo-cell units being adapted to control speed of rotation of individual portions of said feed rollers, and individual portions of a similar set of retarding rollers located prior to said photo-cell units on path of said cloth.

18. A cloth cutting machine as claimed in claim 1 in which brake means are adjustably located towards each end of said frame structure, adapted to frictionally consume inertial energy in said die table during reversing operation thereof.

19. A cloth cutting machine as claimed in claim 1 in which said die table comprises a plurality of interchangeable, detachably attached die table units, each of said die table units being adapted to have detachably attached thereto, subjacent said die table units, a plurality of said cloth cutting blades.

References Cited in the file of this patent
UNITED STATES PATENTS

| | | |
|---|---|---|
| 2,523,153 | Shapiro | Sept. 19, 1950 |
| 2,638,821 | Baumgartner | May 19, 1953 |
| 2,772,736 | Campbell | Dec. 4, 1956 |